US007890926B2

(12) United States Patent
Balathandapani et al.

(10) Patent No.: US 7,890,926 B2
(45) Date of Patent: Feb. 15, 2011

(54) SYSTEM AND METHOD FOR APPLICATION DEVELOPMENT AND DEPLOYMENT

(75) Inventors: Kongalnagarpudur Ramasamy Balathandapani, Coimbatore (IN); Kanchi Lakshminarasimhan Muralidharan, Bangalore (IN)

(73) Assignee: Vaakya Technologies Private Limited, Bangalore (IN)

( * ) Notice: Subject to any disclaimer, the term of this patent is extended or adjusted under 35 U.S.C. 154(b) by 1458 days.

(21) Appl. No.: 11/029,233

(22) Filed: Jan. 4, 2005

(65) Prior Publication Data

US 2006/0150144 A1 Jul. 6, 2006

(51) Int. Cl.
*G06F 9/44* (2006.01)
*G06F 9/445* (2006.01)

(52) U.S. Cl. .................. 717/107; 717/131; 717/154; 717/162; 717/171; 717/176

(58) Field of Classification Search ......... 717/101–103, 717/124–126, 106–107, 127–133, 154–167, 717/171–173, 176–178
See application file for complete search history.

(56) References Cited

U.S. PATENT DOCUMENTS 6,918,113 B2 * 7/2005 Patel et al. ................. 717/178
6,985,939 B2 * 1/2006 Fletcher et al. ............. 709/223

OTHER PUBLICATIONS

Cisco Systems, "Cisco Subscriber Edge Services Manager Solutions Guide", Apr. 2003, Cisco Systems Corporation, pp. i-xiv, Chapter 1: 1-16, Chapter 2: 1-18, Chapter 3: 1-18, Chapter 4: 1-12, Appendix A: 1-8, Appendix B, 1-6.*
Netscape Application Builder, "User Guide", Netscape Communications Corp., pp. i-xii; c1: 1-9, c2: 1-7, c5: 1-17, c6: 1-31, c7: 1-17, c8: 1-29, c10: 1-16, 1999.*
Kapadia et al., "PUNCH: Web Portal for Running Tools", Jun. 2000, IEEE, pp. 38-47.*
U.S. Appl. No. 10/816,493, filed Apr. 1, 2004; entitled System and Method for Program Execution.

* cited by examiner

*Primary Examiner*—Ted T Vo (57) ABSTRACT

The invention pertains to a system and method of application development on a web portal. In one embodiment, the user logs on to a web portal and is provided with various tools to choose from to write an application, compile the application and then test the application. After completing the development process of the application, the user could either choose to store the application on the web portal, thereby using the services of the web portal or download the application on to his own computer. The user is also given the option to deploy the application from the web portal, the portal being used as a server for servicing multiple clients, thereby using the server resources during deployment and avoiding the high cost of infrastructure.

18 Claims, 7 Drawing Sheets

SYSTEM AND METHOD FOR APPLICATION DEVELOPMENT AND DEPLOYMENT

BACKGROUND OF THE INVENTION

1. Field of the Invention

The invention relates generally to the field of application development environments. In particular, the invention relates to a system and method for writing, compiling, testing and deploying the applications on a web portal in a manner that utilizes minimal web portal and network resources.

2. Background of the Invention

There are several methods and systems used to develop applications in both the client-server and stand alone environments. All have several shortcomings, such as resources availability, flexibility to use different tools to develop the applications, backup infrastructure and other such problems.

With the advent of technology, the world is rapidly transforming into a unipolar community where information dissemination and sharing is absolutely crucial. Businesses worldwide are focusing on maximizing their gains by building features and software that would cater to their exclusive need in the most efficient manner. Enterprise resource planning (ERP) and customer relationship management (CRM) exemplify such applications. The infrastructure for application development calls for various software and hardware resources. Software resources include tools and utilities to automate on or more of the SDLC processes. Hardware resources include one or more of computers interconnected to each other in one form or other like Dumb terminal, LAN, WAN, Wireless etc.

Application development has thus assumed great significance. An effective application development environment greatly improves a firm's return on investment by increasing customer satisfaction, improving efficiency and reducing operative costs. Application development assumes significance when the applications are consolidated to generate a viable software package that performs multiple tasks and is thereby a value addition to the firm.

The development of the Web and e-business has ushered in a developer's dilemma. It is now required of him to develop more complex applications in less time. And this greatly necessitates a collaborative application development environment consisting of tightly integrated development teams that have their own niche area of specialization. This explains the inevitability of Application Service Providers who own and operate software, maintain servers and make the applications available to customers via the Internet either in a browser or through some sort of thin client. A thin client is generally a low-cost computing device that works in a server-centric computing model. Thin clients typically do not require state-of-the-art, powerful processors and large amounts of memory because they access applications from a central server or network. Application Service Providers are particularly attractive to small businesses and enterprises chiefly because of the low cost of entry, extremely short setup time, elimination of head count and the high cost of specialized software that would have to be installed otherwise.

However, the shortcoming of the current Application Service Providers is the lack of application testing and deployment facilities that might be very crucial for an enterprise wishing to develop its own customized application but lacks the infrastructure to perform the task. Since developers have two alternatives and can make use of a separate environment to do the programming. Depending on the kind of application development, it may be accomplished using a standalone machine or a collaborative environment.

The need for a collaborative application development environment has greatly popularized the Internet as a highly desirable and popular platform. Web portals like SourceForge and Freshmeat offer a variety of services for collaborative application development. Users and project groups are allotted space on the portal to develop their applications using tools provided by SourceForge. However, the shortcoming of SourceForge is the lack of licensed third part tools such as Visual C++, Oracle development tools, Java development tools and the like to provide the user the flexibility to program on the web portal using a language and tools of their choice. It also does not provide for application deployment or testing tools. The collaborative application development portals serve to bring users together to collaborate and develop applications for the community.

Generally, end users had an in-house information technology team. The mainframe days had the development and deployment done on the same machine. End users and developers connected to a single machine. The resource management was handled in a central location and developers and end users connected with the help of a dumb terminal.

Development on custom applications was outsourced to professional software development organizations. However with the advent of desktops and servers, developers had the flexibility to maintain the resources and move the final executable version to the end users. Along with the flexibility, the complexity to manage the resources had crept in. Also there is a clear demarcation between the application developer(s) and end user(s). End users were normally users who bought shrink wrapped products that were completely developed. Any changes required by the end user or any form of customization for the application was done by the vendor.

However, some companies such as SAP, PeopleSoft provided pre-built components and end users had the flexibility to customize their application themselves at their location.

Zope Corporation with its software, ZOPE, enables members to create and manage dynamic web applications such as portal and intranet sites through a web interface. However, new objects can only be created by writing new Zope add-ons in Python. It does not provide a full-fledged, industry level application development environment where the users are given the flexibility to program using a language or development tool of their choice.

The technologies available today, as listed above, address several shortcomings in the field of application development. However, there still exists a need for a web portal that provides third party licensed tools for application development, application compilation and application testing. Integrated development environments such as Visual Studio, J Builder, which the users can use at low costs on need basis rather than each user having to purchase or license the gamut of software tools from the market.

There also exists a need to provide infrastructure, resources, security, backup facilities, ease of application maintenance and the like for companies that wish to develop and thereafter deploy the application on the web portal itself.

BRIEF SUMMARY OF THE INVENTION

Not Applicable.

BRIEF DESCRIPTION OF THE DRAWINGS

Many of the objects and advantages of the present invention will become apparent to those of ordinary skill in the relevant art after reviewing the following detailed description and accompanying drawings, wherein.

DETAILED DESCRIPTION OF THE INVENTION

The present invention may be embodied in several forms, structures and manners. The description provided below and the drawings show an exemplary embodiment of the invention in the client-server environment. Those of skill in the art will appreciate that the invention may be embodied in other forms, structures and manners not shown below, including the standalone environment. The invention shall have the full scope of the claims and is not to be limited by the embodiments shown below.

The present invention pertains to a system and method of developing applications on a web portal hosted on a server computer. Several companies and individuals wish to develop applications using tools available in the market but lack the infrastructure and resources required to fulfill their needs. Often times the user, who could also be a developer, may require a variety of tools for different purposes such as a different tool to develop the application, another to test the application and subsequently a computing system to deploy the application. For this purpose, he would need to obtain licenses for each software tool from the software vendors or purchase each software tool that he may require to develop the application. Often times, the user/developer may not be an experienced computer programmer and may wish to develop a small application for his needs by writing the business logic. The developer may wish to use a PDA or a mobile phone or any other device with minimal resources to develop his application. As it is evident from the prior art, there is no such system that provides a user to develop a custom application or enterprise level application on a web portal that utilizes minimum network bandwidth and server resources.

This is made possible due to the present invention. In one embodiment, the user can download a runtime engine from the web portal and thereby become a rich client computing system. The runtime engine comprises predefined structures. A predefined structure (PDS) is a structure that is created with an intended functionality of one of several component types. Thus, for example, the PDS for a form would include a generic structure that includes the intended functionality of a user interface, fields, buttons, interrelationships, and expressions. PDSs are also discussed in U.S. application Ser. No. 10/816,493, filed on Apr. 1, 2004 and entitled "System And Method For Program Execution," which is herein incorporated by reference.

The user/developer can log on to a web portal which provides tools that have been licensed from various software vendors or download a runtime engine with the predefined structure, thus giving a user/developer the flexibility to use any software to develop the application. The user is not required to have any of the applications installed on his own computer and can access these services using a web browser or a terminal emulator i.e. a window that emulates the server terminal or the like i.e. the user/developer computer can work as a thin client and therefore utilize resources of the web portal rather than his own, such as the processor, hard disk, memory, for his needs.

The portal also provides certain security and encryption measures to maintain user privacy, avoid piracy and the like as well as backup facilities for application maintenance and recover from failure. Once the application has been developed, the user is given the option to deploy the application from the web portal itself, using the web portal as the central server, which a number of clients can connect to and use, or to download the application on their own computers.

Figure 1:
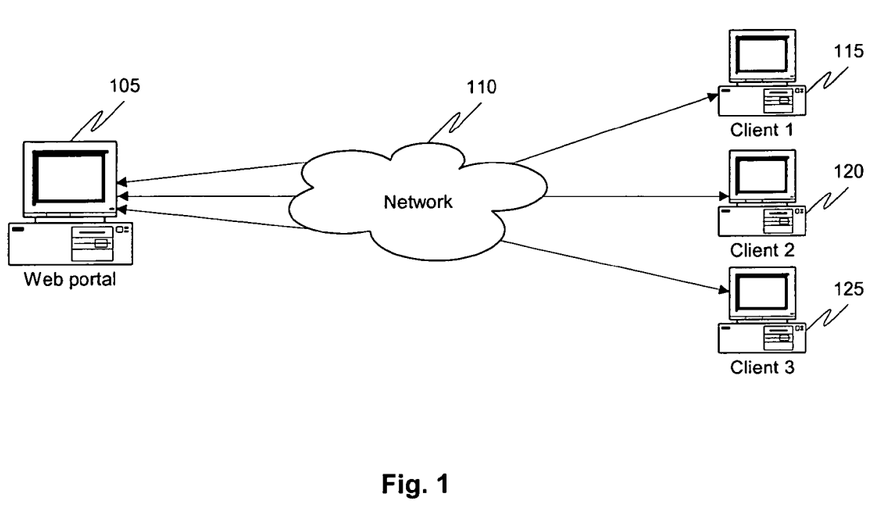
FIG. 1 shows the client-server architecture.

FIG. 1 depicts one embodiment of the invention in a client-server environment. Each client 115, 120, 125 is in communication with a server 105 such as a web server hosting a web portal, through a communication network 110, which may be, for example, a wide area network such as the Internet, a local area network, or a wireless network including base and mobile stations. In one embodiment, the user/developer can develop the application and allow multiple users to connect to the web portal 105 where the application is deployed to utilize the facilities and services provided by the application. For example, a small courier company may wish to maintain logs of packages and mail delivered as well as the whereabouts of their employees but may not have the infrastructure required to provide such a service. They may use the services offered by the portal to develop the application, test the workability of the application using the various testing utilities provided and then deploy the application on the web portal. As per the preferred embodiment of the present invention, the courier company is provided with an option to download a runtime engine with predefined structures on each of the handheld devices operated by the courier company employees. The employees can communicate with the web portal continuously to obtain updates, make changes etc. while utilizing minimal resources of the web portal.

Figure 2:
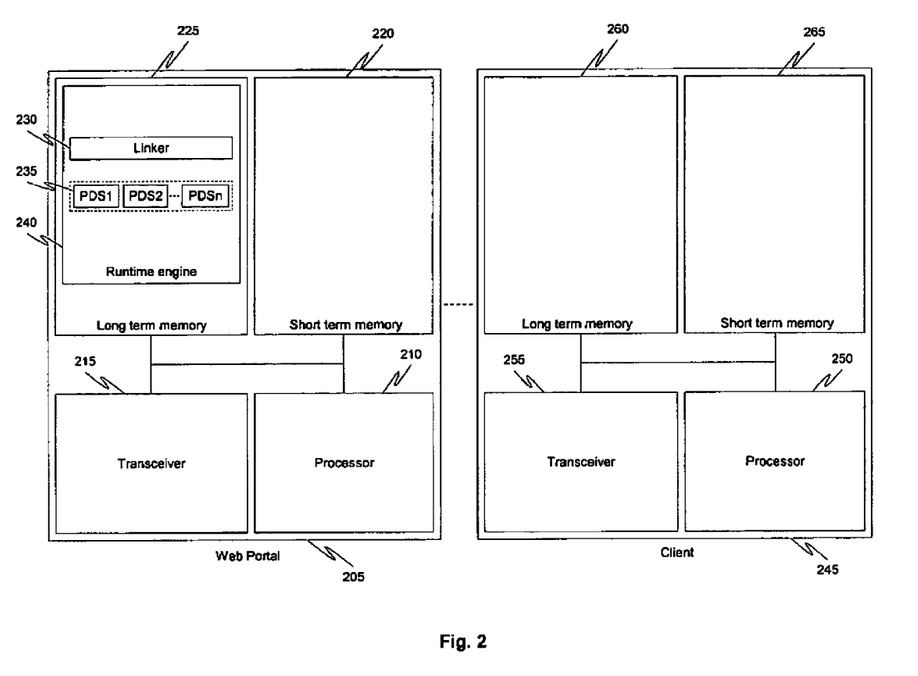
FIG. 2 shows a block diagram depicting the architecture of the web portal and the client, prior to the client becoming a rich client.
Figure 3:
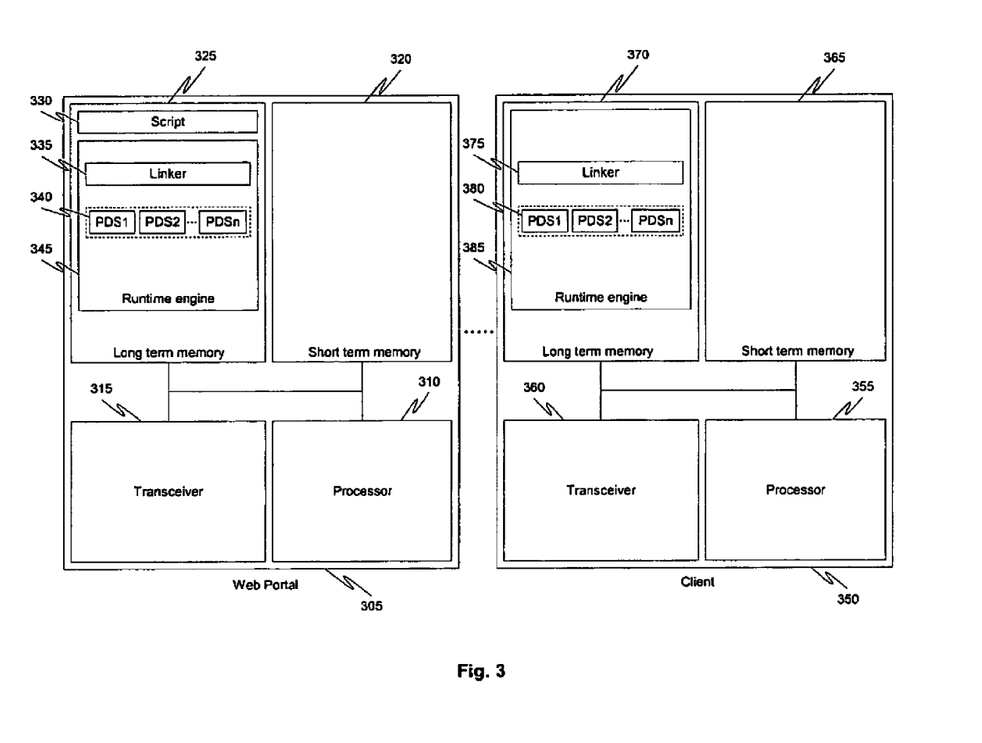
FIG. 3 shows a block diagram depicting the architecture of the web portal and the client, where the client is a rich client.
Figure 7:
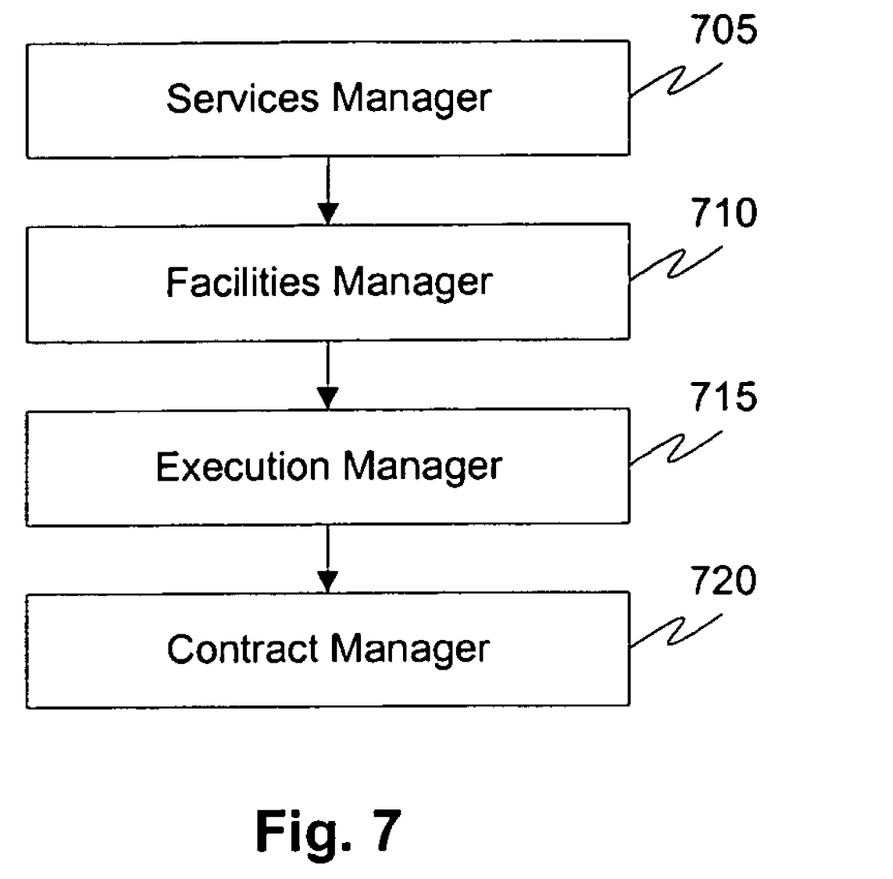
FIG. 7 shows a flow diagram of the components facilitating the process of application development on the web portal pursuant to an embodiment of the invention.

FIG. 2 and FIG. 3 show a block diagram of an embodiment of the components on the web portal 205 and the client computer 245. As shown in FIG. 2, the web portal 205 is hosted on a server computer providing the services the client computer 245 requires. In one embodiment, as shown in FIG. 7, the web portal 205 comprises of a Services Manager 705, a Facilities Manager 710, an Execution Manager 715 and a Contract Manager 720. In the preferred embodiment, the long-term memory 225 of the web portal 205 also comprises a runtime engine 240 with predefined structures 235. When a user/developer accesses the web portal 205, for example, through a web browser or a terminal emulator or the like, stored on the client computer, he is provided with options regarding the services that he may require. For example, he is made to choose between various tools such as Integrated Development Environments, editors and other such tools that he will require for writing the application. In one embodiment, the user/developer is given the option to choose a runtime engine 240 with predefined structures 235. This runtime engine 240 comprises a linker 230 and predefined structures 235. The Services Manager 705 is programmed to control this entire process and accept user preferences. In one embodiment, the Services Manager 705 can automatically provide the costs based on certain predetermined conditions or wait for the owner of the web portal 205 to evaluate the user preferences and provide an estimate.

Once the user accepts the charges and selects the tools he requires for application development, the Facilities Manager 710 on the web portal 205 takes control. In one embodiment, the Facilities Manager 710 is responsible for creating the workspace required by the user, loading tools as per user preferences as well as handling the allocation of resources. In the event the user chooses to develop the application using the runtime engine with predefined structures, the Facilities Manager 710 allows the user to download a copy of the runtime engine 240 with the predefined structures 235. On doing so, the client computing system becomes a rich client computing system. As shown in FIG. 3, the client computing system and the web portal are equipped with the same runtime engine and predefined structures. A client with the runtime engine and predefined structures is called a rich client computing system.

Figure 4:
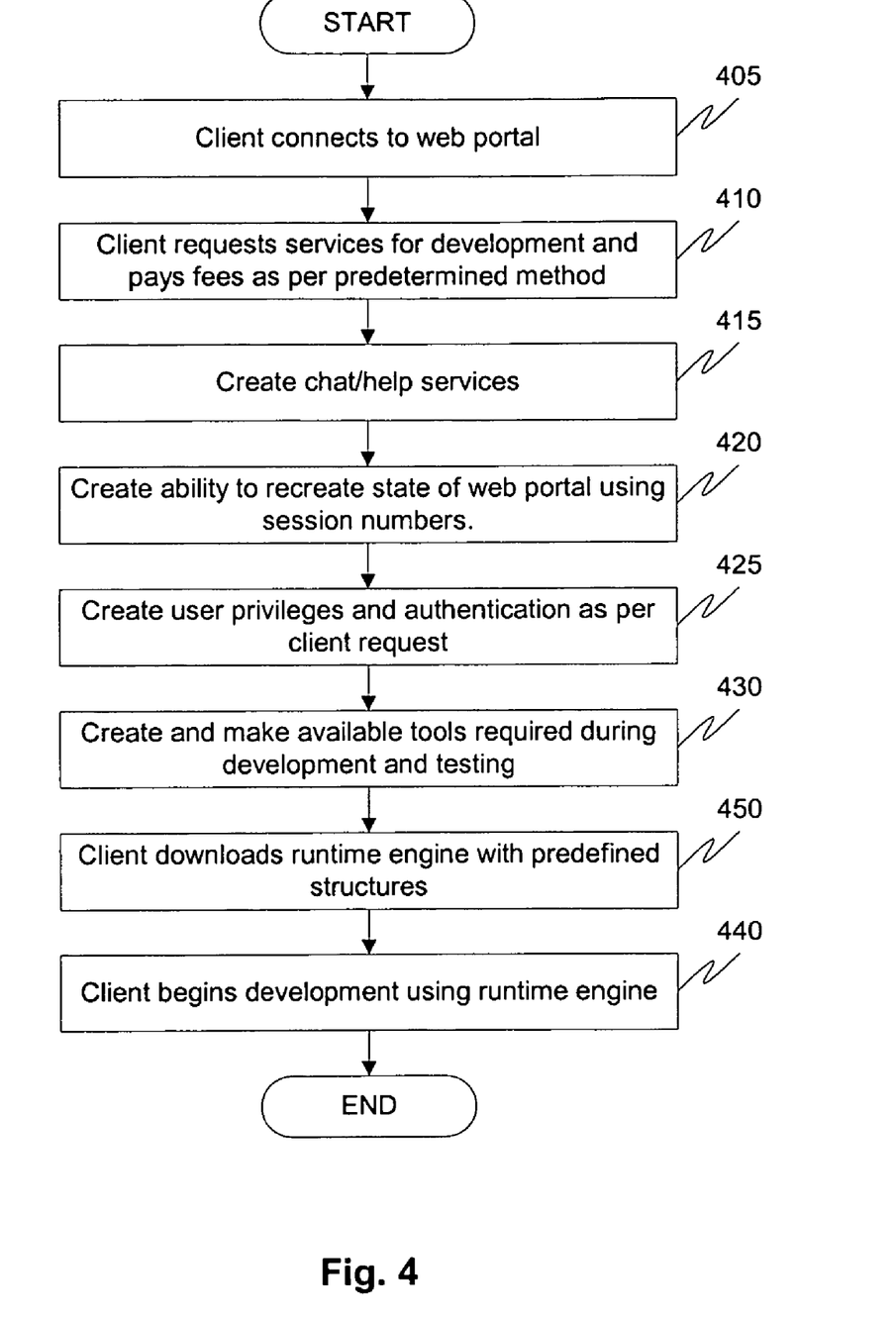
FIG. 4 shows a flow diagram of the steps involved during application development pursuant to an embodiment of the invention.

As shown in FIG. 4, before the development process begins, the user/developer is provided with a host of options. The user/developer logs on to the web portal and chooses the tools, facilities etc. that he would require. In the preferred embodiment, the user downloads the runtime engine with the predefined structures to develop the application based on the technology provided with the runtime engine. The web portal facility is created wherein multiple disparate users/developers, working on different projects can develop the application simultaneously. The Services Manager 705 first is responsible for accepting the user preferences and providing the data entered by the user to the Facilities Manager 710. The Facilities Manager 710 allocates hard disk space on the server, schedules certain events that can be triggered based on user preferences such as schedules set by the user/developer. In one embodiment, where the user/developer decides to use the runtime engine with the predefined structures, the Facilities Manager 710 loads the specific software for the user to perform his tasks. The runtime engine exhibits several functionalities that are worthwhile for users/developers. The runtime engine primarily comprises a plurality of predefined structures (PDS) and a linker.

Every program that has been developed comprises of many components that have the same intended functionality. For example, a program having a Form component has the functionality of having a graphical user interface, fields for data entry, buttons linking the form with other forms or components, interrelationship information showing how data entered into a form affects other forms or components, and expression solving capabilities to compute an expression. A menu component type, for example, exhibits a particular graphical display, includes drop down menus, and drop down menu selections, for linking to various other component types, when executed.

Therefore, the PDSs created have the same intended functionality as one of several component types. Those of skill in the art will appreciate that there are other component types having other intended functionalities, and these other component types are within the scope of the invention. Based on user preferences, the service provider of the web portal can create predefined structures of use by the user/developer or permit the user/developer to create his own predefined structures for use while developing the application for an intended functionality.

The user/developer is also provided with help facilities to assist him in the process of application development. For example, the help services that could be provided include a chat window where the user/developer could talk to other developers or to experienced programmers, made available by the owner of the web portal, and ask questions about problems that he has encountered or he could be provided with a forum to post his questions where other users/experienced programmers, not present in the chat can answer the questions posted at a later time.

The Facilities Manager 710 is responsible for the overall control of the web portal when the user/developer is in the process of developing the application. In one embodiment, the Facilities Manager 710, maintains a log of the workspace utilized by the user to provide the user with the same look and feel of the workspace as he last left it with. This saves the user/developer the time to reconfigure certain tools as per his needs, arrange the items selected or recreate the workspace as per his preferences every time he logs on. The Facilities Manager 710 is also responsible for creating user privileges and authentication. When the user/developer wishes to develop the application, the Facilities Manager 710 is also responsible for authenticating the client and thereby providing access to tools and facilities based on the user/developers established privileges. For example, a developer may not be given access to a schedule calendar for the development cycle and thus the Facilities Manager 710 does not provide the developer with full access.

At every step, the Contract Manager 720 is programmed to maintain a log of the time as well as the tools utilized by the user to provide the user with the charges when the application development has been completed. The Contract Manager 720 is pre-programmed based on the agreement between the client (the user) and the owner of the web portal to update the costs. For example, if the billing is to be on a time-spent basis, the Contract Manager 720 maintains a log of the amount of time the user/developer spends on the web portal and updates the billing accordingly.

In the preferred embodiment, the client downloads the runtime engine and becomes a rich client computing system. The runtime engine comprises predefined structures. On downloading the runtime engine, the rich client computing system is equipped to develop the application using the technology of the runtime engine.

Figure 5:
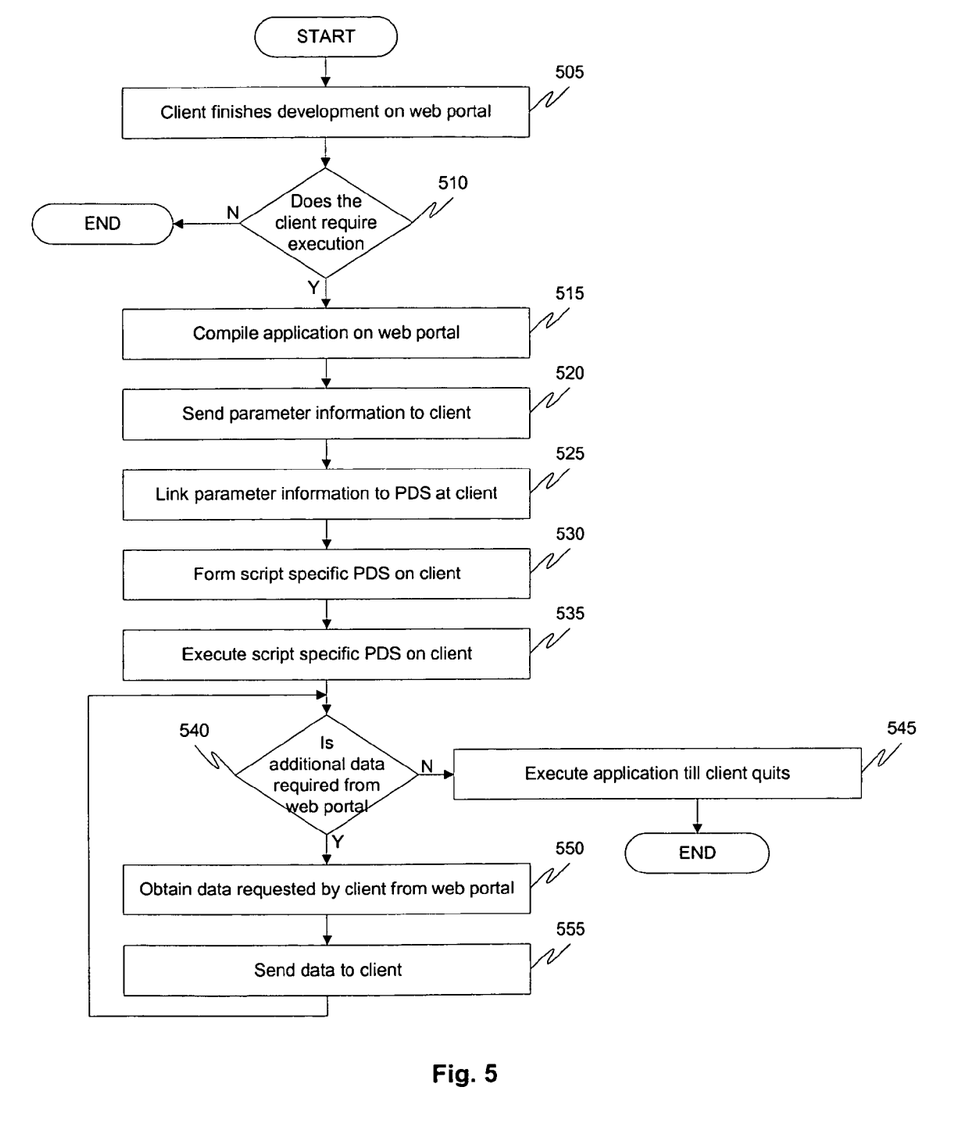
FIG. 5 shows a flow diagram of the steps involved during application deployment pursuant to an embodiment of the invention.

FIG. 5 depicts the development and execution process of an application developed by a user/developer using the runtime engine. Once the client develops, step 505, the application on the web portal using business logic or writing source code, the Execution Manager 715 takes control. As per step 510, the user is provided with an option to use the resources offered by the server computer for deploying the application for his needs, he is given the option to do so at a cost mutually agreed upon and control is given to the Execution Manager 715 to oversee the process. The Execution Manager 715 can work in conjunction with the Contract Manager 720 to keep a tab of the time spent by the user in deploying the application and can update the costs accordingly. The user could also tweak the application on an ongoing basis by utilizing the other components on the server computer.

The user/developer develops the application on the web portal using the predefined structures in the runtime engine. The predefined structures are also present on the rich client computing system. When the user/developer wishes to execute the application from the web portal, he compiles the source code of the application, step 515. When compiled, the parameter information from the source code is sent to the client computing system, step 520. The parameter information is information specific to the user defined in the predefined structures. For example, in the case of a predefined structure of a Form component, the parameter information could comprise the Form name, the fields to be included in the Form, the specific buttons on the Form, the names of the fields and buttons etc. Those skilled in the art shall appreciate that several predefined structures are provided for the user/developer. The parameter information for each predefined structure corresponding to a component shall be different. The same predefined structure can also have different parameter information based on the information specified by the user/developer.

The parameter information of the script is sent to the client, step 520. The linker present at the rich client computing system is responsible for linking the parameter information with the predefined structures at the rich client computing system to create script specific predefined structures on the rich client computing system, step 530. The runtime engine then executes the script specific predefined structures at the rich client computing system, step 535.

During the execution process, the client performs most of the execution. The original script of the application is present at the web portal. The rich client computing system sends a request to the web portal, step 540, when it requires additional information that is present at the web portal but not at the rich client computing system. Additional information may also involve obtaining data from a database present at the web portal. For example, in the case of a courier company may not have the infrastructure to maintain a database within its premises. This database is present at the web portal and the users of the application i.e. employees of the courier company may need information from the database. In this case, the web portal is contacted to fetch this additional information, step 550, 555. Additionally, the web portal can also be contacted when additional parameter information is required from the script to run a different component. The application execution is terminated when the user closes the application.

The entire process of application development comprises of several stages. These five main stages have been depicted in FIG. 6. In one embodiment of the invention, tools that assist the user at all levels of application development and deployment are made available to facilitate the process. The phases involved are described below. Several tools associated with each phase of application development are provided to give flexibility to the user to choose a tool of his liking.

Figure 6:
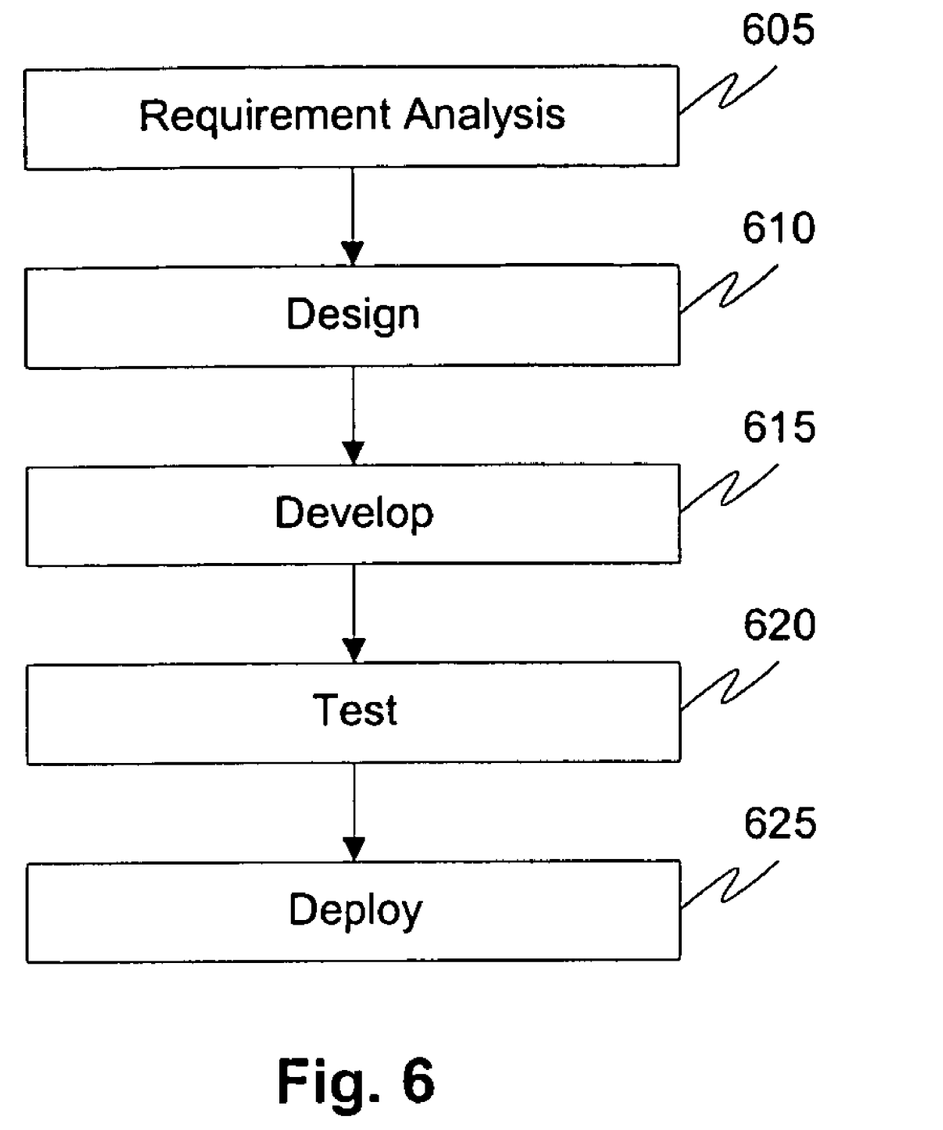
FIG. 6 shows a flow diagram of the steps involved during application development pursuant to an embodiment of the invention.

The first stage of application development includes a thorough requirement analysis 605. This process involves an interactive session between the development managers and the client who wishes to engage the development managers to develop an application. A detailed analysis of the requirements of the client such as the functionality required by the application, the number of users, the resources available during deployment, the architecture i.e. whether the client prefers the application on a client-server environment or a stand-alone environment, interoperability, reliability, reusability and other similar requirements are discussed and identified. The invention provides several tools such as Doors, Requisite Pro, Protégé that can be licensed and provided by the owner of the web portal to assist users/developers in facilitating the requirement analysis phase of application development.

The design process 610 is started immediately after the requirement analysis phase 605. Senior developers and application development managers discuss the design of the application. The design serves as a blueprint for programming the application. For example, the design process may involve the making of block diagrams for the classes and functions to be implemented in the application, the look and feel of the application, the graphical user interface, and other similar application design characteristics are identified. Tools such as Rational Rose, TogetherJ assist users/developers in performing these tasks. The owner of the web portal can license and make available these tools as well for use by the user/developer during application development.

The development managers along with the senior developers use the blueprint to explain the design of the application to the programmers. Tools that generate code directly from the blueprint can be used to facilitate the process. In one embodiment, if the user is not a programmer, he is given the option to use such tools where writing code is eliminated. In case of experienced programmers, integrated development environments and other tools can be provided where the user is given the flexibility to choose his programming language and tool. The programmer can now develop 315 the application and compile the application to an executable.

The testing phase 620 involves the use of testing tools to test various aspects of the application such as testing the application for memory leaks, interoperability, errors and the like. The user is able to rectify the errors to make a working application. This phase completes the development phase of the application. The last phase is the deployment phase 625, where the user can package the application, create help manuals and other ancillary information to market and deploy his application.

The access to the web portal can be asynchronous basis where the web portal is contacted when information is required and then once the information is received, the connection can be disconnected.

What is claimed is:

1. A method of using a web portal for application development and execution, the method comprising:
   downloading a copy of a runtime engine on a client computing system, the runtime engine comprising at least one predefined structure, the client computing system becoming a rich client computing system on receiving the copy of the runtime engine;
   developing an application for an intended functionality, on at least one of the web portal and the client computing system, wherein the developed application includes plurality of components;
   compiling the plurality of components of the application for the intended functionality using the runtime engine present at the web portal, the compiling step further comprises transmitting a plurality of components specific parameter information from the web portal to the rich client computing system;
   executing the application for the intended functionality, on the web portal using the rich client computing system, wherein the executing the application comprises:
      linking the transmitted component parameter information to a predefined structure at the rich client computing system to provide a script specific predefined structure, the predefined structure having an intended functionality corresponding to the intended functionality of the requested component; and
      executing the script specific predefined structure to execute the component; and
   executing a part of the application, that cannot be executed on the rich client computing system, on the web portal, whereby the rich client computing system enables usage of minimal network bandwidth and server resources.

2. The method of claim 1, wherein the method is used to develop applications using devices such as mobile device or personal digital assistant.

3. The method of claim 1, wherein the developing step further comprises writing a business logic or source code of the application for an intended functionality, on a web portal.

4. The method of claim 3, wherein a user is provided with a plurality of proprietary and third-party licensed development tools including a type business logic development capable tool.

5. The method of claim 3, wherein the source code can be encrypted and secured using user-selected encryption facilities for safeguarding the application source code from misuse.

6. The method of claim 3, wherein a user can be provided with a plurality of proprietary and third-party licensed testing tools to test the application for the intended functionality.

7. The method of claim 1, wherein the downloading of the runtime engine is required only once during the application development and execution unless the runtime engine has been updated on the web portal.

8. The method of claim 1, wherein the executing the application on the rich client computing system further comprises:
communicating with the web portal to obtain additional data, wherein additional data includes additional component specific parameter information.

9. The method of claim 1, wherein the executing a part of the application step further comprises:
performing on the web portal, at least one calculation that is required by the application, the calculation requiring a database or additional data not present on the rich client computing system but present on the web portal.

10. The method of claim 1, wherein the web portal provides user authentication.

11. The method of claim 10, wherein the authentication further comprises providing varied levels of access to a plurality of tools, data and services based on the authentication.

12. The method of claim 11, wherein the web portal has capabilities to recreate a previous state of the web portal left by a user at every login on the web portal, based on the authentication.

13. The method of claim 1, wherein the application can be stored on the web portal or on any other user selected computing system.

14. The method of claim 1, wherein the web portal provides at least one help service, wherein the help service comprises chat service, forums for posting questions, and question-answer services for guiding a user while developing the application.

15. The method of claim 1, wherein the web portal provides proprietary and third-party licensed tools for stages involved in application development, the stages comprising requirement analysis, design, application programming, testing and application deployment.

16. The method of claim 1, wherein the web portal provides back up storage facilities for storing copies of data created in the process of application development, data created by the application during execution and user specific data.

17. The method of claim 1, wherein the source code can be encrypted and secured using user-selected encryption facilities for safeguarding the application source code from misuse.

18. The method of claim 1, wherein a user developing the application can be charged using a predetermined method of billing, the predetermined method of billing comprising a type time spent.

* * * * *